(12) United States Patent
Timmermans

(10) Patent No.: US 7,305,766 B1
(45) Date of Patent: Dec. 11, 2007

(54) METHOD FOR ASSEMBLING A BUS

(75) Inventor: Joseph Timmermans, Oak Park, MI (US)

(73) Assignee: Altair Engineering, Inc., Troy, MI (US)

( * ) Notice: Subject to any disclaimer, the term of this patent is extended or adjusted under 35 U.S.C. 154(b) by 515 days.

(21) Appl. No.: 10/350,466

(22) Filed: Jan. 24, 2003

Related U.S. Application Data

(60) Provisional application No. 60/352,702, filed on Jan. 28, 2002.

(51) Int. Cl.
*B62D 65/00* (2006.01)

(52) U.S. Cl. .................. 29/897.2; 29/428; 29/783; 29/791; 296/178; 296/181.1; 296/193.04; 296/193.07; 296/203.01

(58) Field of Classification Search ............ 29/897.2, 29/430, 783, 791; 296/1.01, 178, 179, 181.1, 296/193.03, 193.07, 193.04, 193.08, 193.09, 296/203.01, 203.02, 64, 203.04, FOR. 114, 296/FOR. 115, FOR. 116, FOR. 117, FOR. 118
See application file for complete search history.

(56) References Cited

U.S. PATENT DOCUMENTS

| | | | | |
|---|---|---|---|---|
| 2,239,089 A | * | 4/1941 | Fageol | 296/203.01 |
| 3,186,755 A | * | 6/1965 | Ward | 296/178 |
| 3,881,765 A | * | 5/1975 | Cerra et al. | 296/178 |
| 4,033,033 A | | 7/1977 | Heffner | |
| 4,254,987 A | * | 3/1981 | Leonardis | 296/178 |
| 4,358,914 A | * | 11/1982 | Geyer | 52/643 |
| 4,469,369 A | * | 9/1984 | Belik et al. | 296/178 |
| 4,773,701 A | * | 9/1988 | Messori | 296/178 |
| 5,131,714 A | * | 7/1992 | Evans, Sr. et al. | 296/182.1 |
| 5,577,793 A | * | 11/1996 | Kobasic | 296/146.4 |
| 5,934,739 A | * | 8/1999 | Waldeck | 296/178 |
| 6,183,034 B1 | * | 2/2001 | Moody et al. | 296/96.21 |
| 6,685,254 B2 | * | 2/2004 | Emmons et al. | 296/178 |

FOREIGN PATENT DOCUMENTS

NL 8602834 A * 6/1988

OTHER PUBLICATIONS

Paul Dvorak, FEA and optimization leads to a more efficient design process, Oct. 11, 2001, Machine Design, pp. 55-56.*

* cited by examiner

*Primary Examiner*—Jermie E. Cozart
(74) *Attorney, Agent, or Firm*—Young Basile

(57) ABSTRACT

A method for constructing a bus, wherein a module associated with the front end of the bus is separately constructed and assembled to the shell after interior components of the bus have been installed. The shell of the bus can be fabricated at a first work station. The shell can be made transversely or laterally with respect to the longitudinal access of the bus to one or more work stations. At the subsequent work stations, interior components of the bus can be moved through the open ends of the bus. After the majority of the interior components have been installed with respect to the bus, the module supporting the windshield and bumper can be installed with respect to the shell. The module can also support the dashboard and steering column.

14 Claims, 3 Drawing Sheets

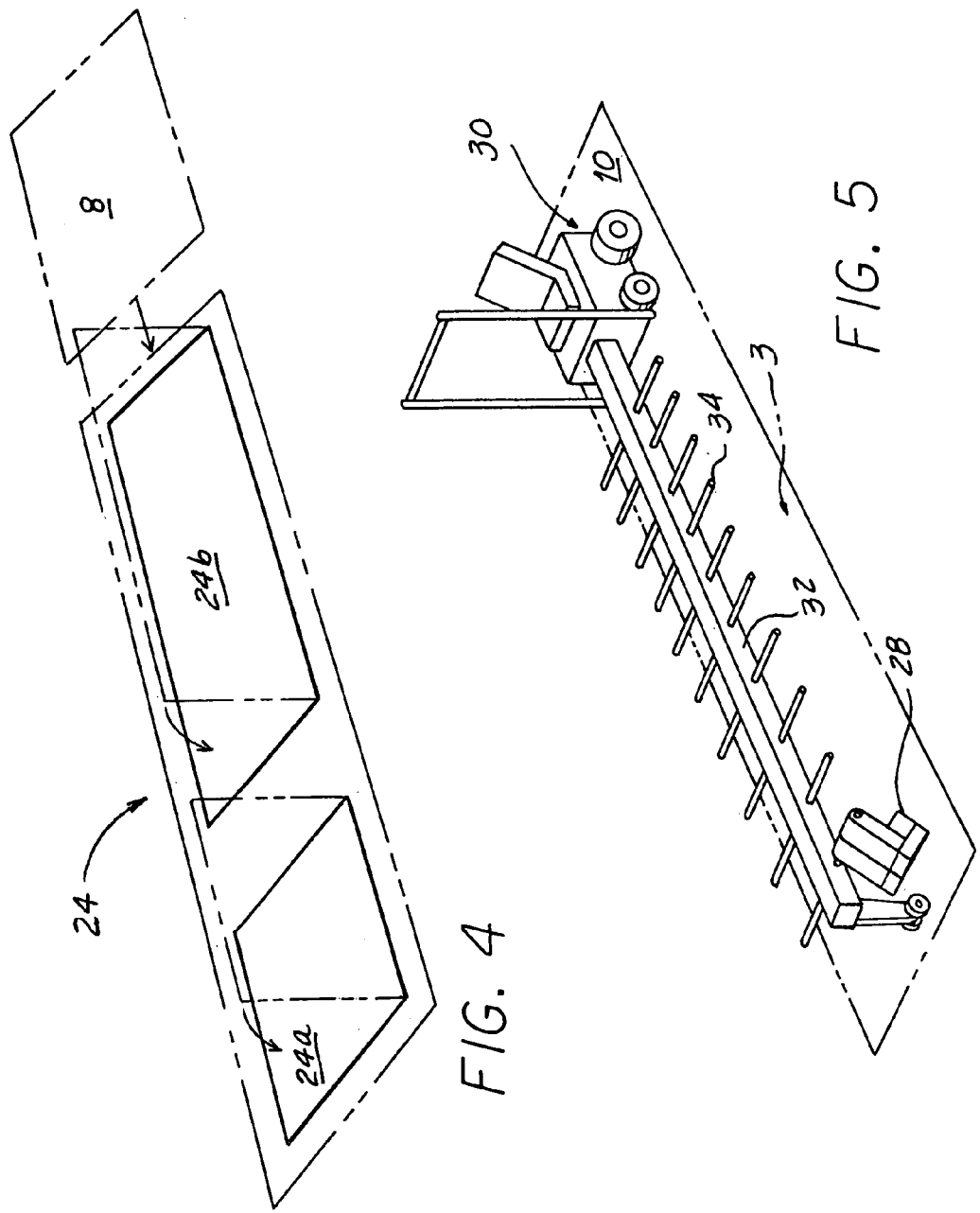

METHOD FOR ASSEMBLING A BUS

CROSS-REFERENCE TO RELATED APPLICATIONS

This application claims the benefit of the provisional patent application 60/352,702 for a BUS CONSTRUCTION, filed on Jan. 28, 2002, which is hereby incorporated by reference in its entirety. This claim is made under 35 U.S.C. §119(e); 37 C.F.R. § 1.78; and 65 Fed. Reg. 50093.

FIELD OF THE INVENTION

This invention relates to a method of manufacturing a motor vehicle bus and to the bus structure resulting from the invention methodology.

BACKGROUND OF THE INVENTION

Buses are typically manufactured by forming a closed shell structure including a roof, a structural floor, sides, front-end, and rear-end, moving the closed shell structure along a path aligned with the longitudinal axis of the structure, and loading components of the bus into the shell structure through the windows, doors, or windshield opening. The components may include, for example, the seats and the passenger compartment floor. This method is time consuming and labor intensive since it involves loading individual components into the bus individually and through relatively small apertures in the shell structure.

SUMMARY OF THE INVENTION

According to the invention, the shell structure is formed with an open front-end; the shell structure is moved laterally from station to station in a direction generally normal to the lengthwise axis of the shell structure; the interior components of the bus are loaded into the interior of the shell structure through the open front-end; a front-end module is attached to the front of the shell structure to close the front-end of the bus shell; the wheel assemblies are installed; and the shell structure is moved on its wheels along its lengthwise axis to various stations where the windows, doors, windshield, and exterior cladding are applied from locations generally outside of the shell structure.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 4 is a perspective view illustrating the loading of the seats into the shell structure; and FIG. 5 is a perspective schematic view illustrating the loading of the passenger floor into the shell structure.

DESCRIPTION OF THE PREFERRED EMBODIMENT

Figure 1:
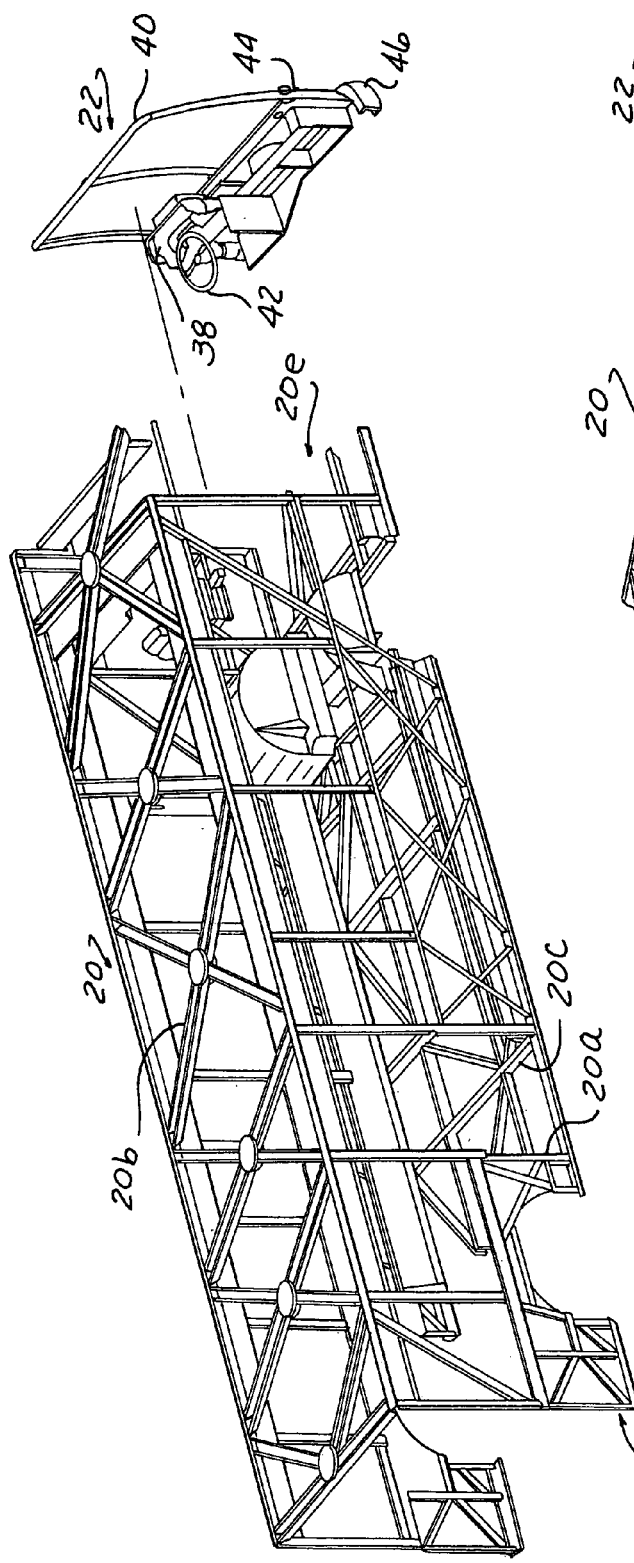
FIG. 1 is a perspective exploded view of a bus shell structure according to the invention.

As seen in FIG. 4, the plant 10 for assembling the bus structure includes assembly stations 1–7 and pre-assembly stations 8–17.

The basic bus shell structure 20 is formed in known manner at station 1 utilizing known assembly techniques and known jigs. Specifically, shell structure 20 includes lattice members 20a forming the sides of the shell, lattice members 20b forming the roof of the shell, and lattice members 20c forming the structural floor of the shell. Note that the front and rear ends 20e and 20d of the shell structure are open. The front-end of the shell structure, rather than being formed initially at station 1 as a fixed part of the shell structure, is formed as a separate module structure 22 in the pre-assembly area 15. Following formation of the shell structure 20 at station 1, minus the front module 22, the shell structure is moved in a direction lateral to the lengthwise axis of the shell structure, utilizing suitable dollies, to station 2 where the passenger floor of the bus is installed in overlying relation to the structural floor 20c.

As best seen in FIG. 4, the passenger floor or over-floor 24 may be prepared in two sections 24a and 24b at pre-assembly station 8 whereafter both sections are moved from pre-assembly station 8 through the open front-end 20e of the shell structure for installation in the shell structure. Floor structure 24a will be understood to be installed over the usual kick-up overlying the rear axle of the vehicle and floor section 24b will be understood to be installed forwardly of section 24a to cover the primary floor area of the shell structure. Floor sections 24a, 24b may be secured to the shell structure 20 using suitable glues for example. Floor sections 24a, 24b may be initially installed in the shell structure in an upwardly tilted position, as seen in dash lines FIG. 4, whereafter they may be pivoted downwardly to their flat installed positions.

Following the floor installation at station 2 the shell structure 20 is moved laterally on the dollies to assembly station 3 where the engine assembly 26, prepared in pre-assembly station 9, may be installed through open rear end 20d of the shell structure and the seats 28, prepared at pre-assembly station 10, may be installed through the open front-end 20e of the shell structure. With reference to FIG. 5, the seats may be installed utilizing a forklift 30 positioned at pre-assembly station 10 and equipped with a boom 32 extending forwardly from the mast of the lift truck and including a plurality of pins 34 each hangably supporting a bus seat 28. With this arrangement the forklift may be maneuvered to insert the boom 32 carrying the seats 28 into the interior of the shell structure 20 through the open front-end 20e of the shell structure to position the seats proximate their ultimate locations in the bus, whereafter it is a simple matter to remove the seats 28 from the respective pins 34 and install the seats in the bus, thereby minimizing the amount of movement required to install each seat and specifically avoiding the awkward problem of moving each seat into the interior of the bus through a narrow window or side door opening and thereafter moving the seat lengthwise in the bus to its proper location. The seats are installed in the bus employing the usual bolting techniques.

Following installation of the engine assembly and the seats, the shell structure is moved laterally on the dollies to assembly station 4 where further interior and engine components are installed with the engine components being prepared at pre-assembly station 11 and installed through the open rear 20d of the shell structure and the interior components being prepared at pre-assembly station 12 and installed through the open front-end 20e of the shell structure.

The shell structure is thereafter moved laterally on the dollies to assembly station 5 where further interior components may be installed through the open front-end 20e of the shell structure from pre-assembly station 13 and a heating and air conditioning unit 36 (HVAC), prepared at pre-assembly station 14, may be installed through the rear 20d of the shell structure in overlying relation to engine assembly 26.

Figure 2:
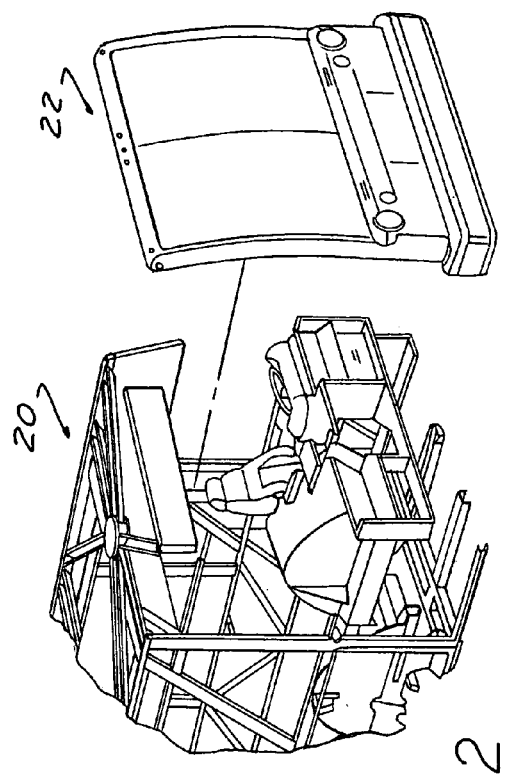
FIG. 2 is a perspective exploded view of an alternate shell structure.
Figure 3:
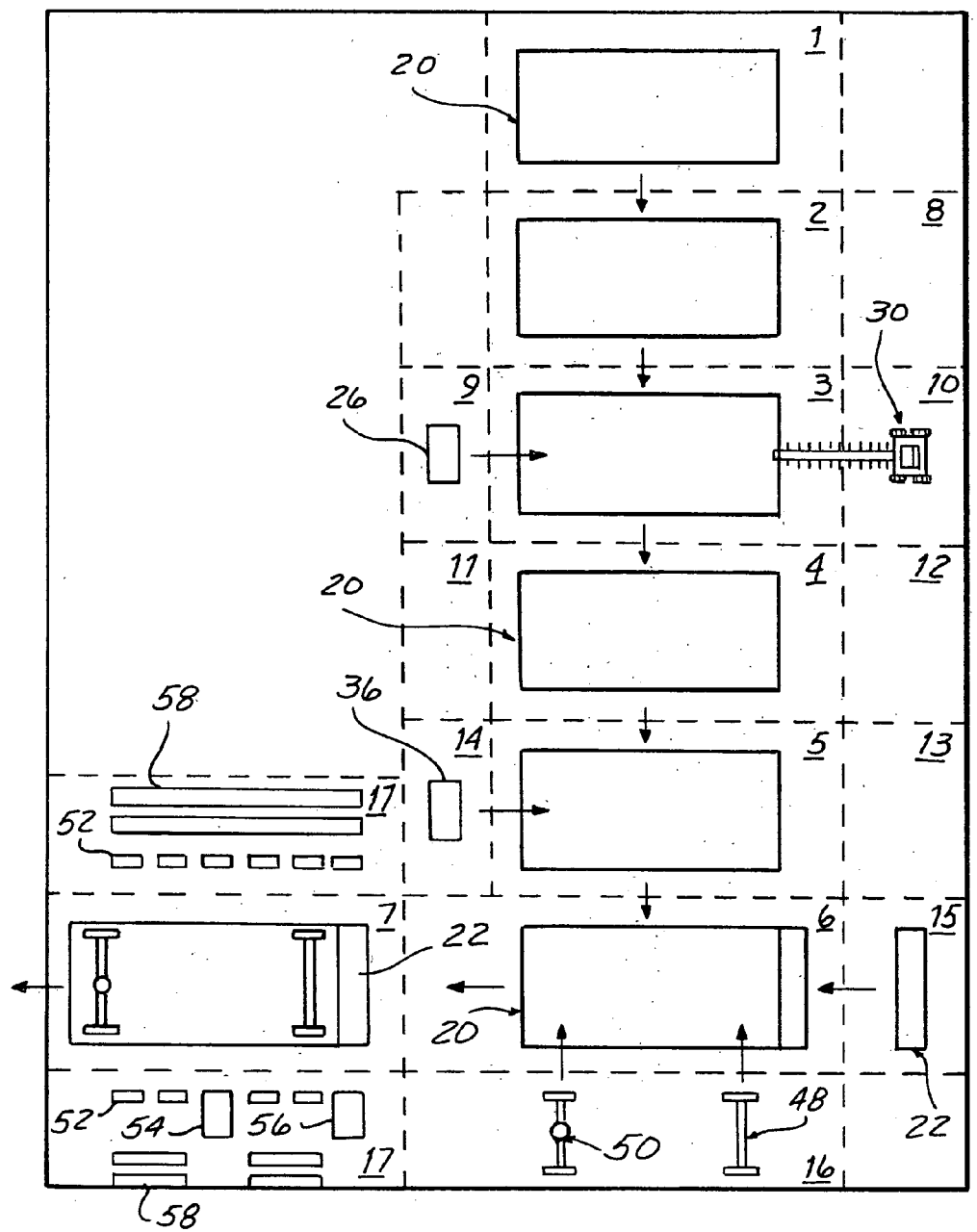
FIG. 3 is a layout view of an assembly plant for forming the bus structure.

The shell structure is thereafter moved laterally on the dollies to assembly station 6 where the front-end module 22, which has been formed at pre-assembly station 15, is suitably attached to the front-end 20d of the shell structure utilizing, for example, bolts whereby to close the open front-end 20e of the shell structure. Module 22 may include instrument panel 38, windshield 40, steering column assembly 42, headlamp assemblies 44, front bumper 46, as well as suitable brake, throttle, and shift controls. Alternatively, as seen in FIG. 2, the front module may include only the windshield and front fascia and bumper of the bus with the instrument panel, steering column assembly, and vehicle controls being formed as a part of the main body shell structure 20. Following attachment of the module 22 at station 6, the shell structure is suitably elevated, the dollies are removed, and front and rear axle/wheel assemblies 48, 50, prepared at pre-assembly station 16, are slid under and suitably attached to the shell structure so that the shell structure is now supported for rolling movement on its wheels.

The bus is now rolled on its wheels in a direction parallel to the lengthwise axis of the shell structure to assembly station 7 where the bus windows 52, doors 54, 56 and side cladding 58 maybe installed from the pre-assembly station 17 wherein the installation takes place primarily from labor performed outside the opposite sides of the shell structure.

From station 7 the bus may be moved longitudinally on its wheels to further stations (not shown) where further exterior componentry may be suitably added whereafter the bus may be moved to suitable test and inspection stations.

The described bus structure and manufacturing methodology has several advantages as compared to prior art structures and methodologies. To wit:

the use of a modular front-end that is not attached to the main body shell structure until a later point in the assembly process allows all of the major interior components of the bus to be installed through the open front-end of the bus, rather than through narrow openings provided by the side doors and side windows of the shell structure where the front-end is fixedly secured to the main body shell structure prior to the installation of the interior components;

the late phase attachment of the front-end module allows an L-shaped assembly process wherein the bus is moved initially laterally through several stations in a direction normal to the lengthwise axis of the bus whereafter, following attachment of the front-end module and installation of the axle/wheel assemblies, the bus is moved in a direction parallel to the lengthwise axis of the bus. This L-shaped assembly format allows the provision of pre-assembly areas in the area defined between the legs of the L and in the areas along the outer faces of the legs whereby to provide a compact factory floor package plan with a substantial savings in floor space;

the use of the modular front-end allows the front-end to be removed in the event of a front-end accident and replaced immediately with a new replacement front-end so that the bus is out of service only for the time required to install the new front-end rather than for the much longer time required to repair the front-end;

the use of pre-assembly areas in parallel relation to the main assembly line to fabricate all of the primary sub-assemblies of the vehicle minimizes the number of workers working on the bus as it moves along the main assembly line, whereby to simplify the assembly procedures along the main assembly line;

the use of multiple pre-assembly areas allows specialists in each sub-assembly operation to be stationed at the respective sub-assembly areas, whereby to assure accurate, precise pre-assembly of the various sub-assembly components; and the ability to install the floor through the open front-end of the shell structure in two large sections is vastly preferable to the prior art assembly procedure whereby, because of the closed front-end, the floor is moved into the interior of the bus in small sections which are thereafter pieced together and built up utilizing sanding and bondo operations to form the final composite floor structure.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the description, which scope is to be accorded the broadest interpretation so as to encompass all such modifications and equivalent structures as is permitted under the law.

What is claimed is:

1. A method for assembling a bus comprising the steps of:
forming a shell of the bus at a first workstation, the shell having a first side, a second side, a roof, a floor, a first end and a second end located at opposite longitudinal ends of the shell, at least one of the first and second ends being substantially open, and a substantially open passage extending between the first and second ends;
moving the shell along a first path extending substantially transversely with respect to a longitudinal axis of the shell to a second workstation;
positioning a pre-assembly station alongside the first path adjacent the second workstation, such that the pre-assembly station is positioned immediately opposite one of the first and second ends of the shell and along the longitudinal axis of the shell when the shell is moved into position adjacent the pre-assembly station;
moving the shell along the first path between a plurality of pre-assembly stations; and
positioning each of the plurality of pre-assembly stations alongside the first path such that each pre-assembly station is positioned immediately opposite one of the first and seconds ends of the shell and along the longitudinal axis of the shell when the shell is moved into position adjacent the respective pre-assembly station.

2. The method of claim 1 further comprising the step of:
moving the shell along a second path extending substantially parallel to the longitudinal axis of the shell.

3. The method of claim 1 further comprising the steps of:
positioning a component to be engaged with respect to the bus at the pre-assembly station located alongside the first path adjacent the second work station; and moving the component to be engaged with respect to the bus through one of the first and second ends when the shell is positioned at the second workstation.

4. The method of claim 1 further comprising the step of:
moving an over-floor through one of the first and second ends to substantially cover the floor of the shell prior to the engaging step.

5. The method of claim 4 further comprising the step of:
forming the over-floor in two sections.

6. The method of claim 1 further comprising the step of:
moving the shell along a second path between a plurality of workstations, the second path extending substantially parallel to the longitudinal axis of the shell.

7. The method of claim 1 further comprising the steps of:
attaching at least one of a front axle assembly and a rear axle assembly to the shell while positioned at the second workstation;
moving the shell along a second path to a third workstation while supporting the shell for movement with at least one of the front and rear axle assemblies, the second path extending substantially parallel to the longitudinal axis of the shell; and
attaching at least one of a door, window, and side cladding to the shell while positioned at the third workstation.

8. The method of claim 7 further comprising the step of installing interior components of the bus through at least one of the first and second ends prior to the shell arriving at the second work station.

9. The method of claim 8 further comprising the step of steps of:
positioning a component to be assemble to the interior of the shell at the pre-assembly station;
moving the component from the pre-assembly station to the interior of the shell through one of the first and second ends of the shell when the shell is moved into position adjacent the pre-assembly station.

10. The method of claim 1 further comprising the steps of:
positioning a component to be assemble to the interior of the shell at the pre-assembly station;
moving the component from the pre-assembly station to the interior of the shell through one of the first and second ends when the shell is moved into position adjacent the pre-assembly station.

11. The method of claim 10 further comprising the step of forming a module operable to support a windshield and a bumper, the module engageable with the first end of the shell to substantially close the passage at the first end of the shell.

12. The method of claim 11 further comprising the step of engaging the module to the first end of the shell after the step of installing the interior components is completed.

13. A method for assembling a bus comprising the steps of:
forming a shell of the bus at a first workstation from a plurality of lattice members, the shell having a first side, a second side, a roof and a floor, first and second ends at opposite longitudinal ends of the shell, and a substantially open passage extending between the first and second ends;
moving the shell along a first path to a second workstation;
forming a module operable to support a windshield and a bumper engageable with the first end of the shell to substantially close the passage at the first end;
engaging the module with respect to the shell after the moving step;
supporting a plurality of rows of seats on a boom; and
moving the boom through one of the first and second ends with moving means prior to the engaging step.

14. A method for assembling a bus comprising the steps of:
forming a shell of the bus at a first workstation, the shell having a first side, a second side, a roof, a floor, a first end and a second end located at opposite longitudinal ends of the shell, at least one of the first and second ends being substantially open, and a substantially open passage extending between the first and second ends;
moving the shell along a first path extending substantially transversely with respect to a longitudinal axis of the shell to a second workstation; and
positioning a pre-assembly station alongside the first path adjacent the second workstation, such that the pre-assembly station is positioned immediately opposite one of the first and second ends of the shell and along the longitudinal axis of the shell when the shell is moved into position adjacent the pre-assembly station;
positioning a component to be assemble to the interior of the shell at the pre-assembly station;
moving the component from the pre-assembly station to the interior of the shell through one of the first and second ends when the shell is moved into position adjacent the pre-assembly station;
forming a module operable to support a windshield and a bumper, the module engageable with the first end of the shell to substantially close the passage at the first end of the shell; and
positioning the module at the pre-assembly station located along the first path adjacent the second work station.

* * * * *